United States Patent [19]

Tanikoshi

[11] 4,163,182

[45] Jul. 31, 1979

[54] ACTUATING CIRCUIT FOR D.C. MOTOR

[75] Inventor: Kinji Tanikoshi, Kawasaki, Japan

[73] Assignee: Canon Kabushiki Kaisha, Tokyo, Japan

[21] Appl. No.: 808,669

[22] Filed: Jun. 21, 1977

[30] Foreign Application Priority Data

Jun. 22, 1976 [JP] Japan .................................. 51-73730
Jun. 22, 1976 [JP] Japan .................................. 51-73732

[51] Int. Cl.$^2$ ............................................ H02P 5/00
[52] U.S. Cl. .................................... 318/331; 318/332
[58] Field of Search ............... 318/101, 331, 332, 395, 318/430, 431, 432

[56] References Cited

U.S. PATENT DOCUMENTS

| | | | |
|---|---|---|---|
| 3,512,068 | 5/1970 | Mori ....................................... | 318/331 |
| 3,517,291 | 6/1970 | Carruth ................................. | 318/332 |
| 3,560,828 | 2/1971 | Kobayashi et al. ................... | 318/332 |
| 3,710,219 | 1/1973 | Takahashi et al. ................... | 318/331 |
| 3,777,244 | 7/1972 | Kosaka ................................. | 318/331 |

OTHER PUBLICATIONS

John Markus, Sourcebook of Electronic Circuits, 6-1-0-69, p. 167, "Constant Current Regulator".

Primary Examiner—Gene Z. Rubinson
Assistant Examiner—M. K. Mutter
Attorney, Agent, or Firm—Toren, McGeady and Stanger

[57] ABSTRACT

A D.C. motor control circuit including a wheatstone bridge type speed regulating circuit with a transistor arranged for detection of the counter-EMF developed across the motor armature to control operation of a drive control circuit. In one embodiment of the invention, an actuating circuit comprises a constant voltage source formed from a constant current circuit connected parallel to an electrical power supply source for the motor and a variable resistor connected in series to the constant current voltage source. A diode applies the output of the variable resistor to the base of the transistor to thereby effect conduction of this transistor.

7 Claims, 5 Drawing Figures

ACTUATING CIRCUIT FOR D.C. MOTOR

BACKGROUND OF THE INVENTION

1. Field of the Invention

This invention relates to D.C. motor speed control apparatus, and more particularly to a D.C. motor speed control apparatus of the type in which the armature winding of the motor is connected in one branch of a Wheatstone bridge circuit with an output proportional to the shaft speed being utilized in controlling the electrical power supply to the motor. Still more particularly, it relates to improvements of an actuating circuit associated with such a motor speed control circuit.

2. Description of the Prior Art

A D.C. motor speed control circuit of the Wheatstone bridge type is, for example, disclosed in Japanese Patent Publication No.Sho 50-40442 (Date of Publication: Dec. 24, 1975). FIG. 1 shows an example of this type of circuit. Here a D.C. motor DCM with an armature winding M having a resistance Ra forms a Wheatstone bridge together with three resistors $R_1$, $R_2$ and $R_3$. Connected across a pair of output terminals or points a and b, is an npn transistor $Tr_2$ and a spring of two diodes $D_1$ and $D_2$. The base of transistor $TR_2$ is connected to the point a, between registers $R_2$ and $R_3$. Its emitter is connected through a resistor $R_4$ to a negative input terminal or point d between resistor $R_3$ and the motor armature M. The emitter is also reverse biased by the string of two diodes $D_1$ from the point b between resistor $R_1$ and the motor armature. Hence the collector current depending upon the counter-EMF developed across the armature can be utilized to control the electrical power supply to the motor by using a pnp transistor $Tr_1$. The latter is connected between a positive input terminal c of the Wheatstone bridge circuit and a positive electrode of an electrical power source or battery E through a control switch $S_1$.

The voltage Et across the motor armature M is composed of two components; one is an equivalent developed counter electromotive force (EMF) Ea and the second is a voltage across the armature resistance Ra, and therefore may be expressed as $$Et = EA + Ra Ia \qquad (1)$$

Here Ia is the current flowing through the armature resistance Ra. When the resistance Ra is selected so that the relationship $Ra/R_1 = R_3/R_2$ is satisfied, the voltage appearing across the output terminals a and b of the Wheatstone bridge circuit is equal to the counter-EMF developed across the motor armature M. This counter-EMF Ea may be expressed as $$Ea = (Z/a) \cdot p \cdot \phi \cdot n \qquad (2)$$

wherein Z is the number of conductors; p is the number of poles; $\phi$ is the magnetic flux density per pole; a is the number of turns of wire; and n is the number of revolutions of the rotor. All of the above parameters except the n are constants of the design, thus the equation (2) may be written, $$Ea = Kn \qquad (3)$$

With this Wheatstone bridge circuit, therefore, it is possible to control the number of revolutions of the rotor, that is, the speed of rotation of the motor, as a function of only one variable Ea in a manner such that the output of the Wheatstone bridge circuit is applied to the base of the transistor $Tr_1$. This can then control the current flowing through the emitter-collector of transistor $Tr_1$.

In operation, after a stationary state has been attained to drive the motor DCM at a constant speed, the output voltage $V_D$ of the Wheatstone bridge circuit is maintained constant depending upon the difference between the voltage $V_F$ across diodes $D_1$ and the base-emitter voltage $V_{EB}$ of transistor $Tr_2$ regardless of how much current flows through the diodes $D_1$ and the transistor $Tr_2$. Assuming that load on the motor DCM is increased a decrease occurs in the number of revolutions of the rotor. The voltage Et across the motor winding is then decreased. This decreases the potential at the point b, along with the emitter potential of transistor $Tr_2$. This in turn causes an increase in the base potential of transistor $Tr_1$ relative to the emitter potential. As a result, the current supply to the Wheatstone bridge circuit is increased until the speed of rotation of the motor is restored to the initial predetermined level.

The conventional actuating circuit for use with the D.C. motor speed control circuit of FIG. 1 is shown in the same figure. It includes a resistor $R_5$ and a capacitor $C_1$. These are connected in series between the base electrode of transistor $Tr_1$ and the negative terminal of the direct current supply source E. This actuating circuit is, however, not suited for assurance of initiation of operation of the speed control circuit at the time of closure of the main switch $S_1$. For example, when the voltage of the energy source E increases at a slow rate to the critical level for the normal operation of the motor DCM, a long time lag results. Alternatively when switch $S_1$ is opened at the time the motor DCM is restrained, the charge stored on the capacitor $C_1$ is retained except for spontaneous leakage because of the lack of the discharge circuit therefor. This is so because the transistor $Tr_2$ is cut off at that time. Consequently, the subsequent closure of switch $S_1$ before capacitor $C_1$ is not completely discharged fails to result in actuation of the motor DCM, for transistor $Tr_1$ is not rendered conductive between the emitter and base thereof.

SUMMARY OF THE INVENTION

The present invention concerns the above mentioned Wheatstone bridge type of D.C. motor speed control apparatus. It is an object of the invention to improve the actuating circuit and to assure initiation of operation of the D.C. motor any time it is activated.

Another object is to provide an improved actuating circuit associated with the speed control circuit without adversely affecting the speed control operation.

Still another object is to reduce the consumption of electrical energy which would otherwise result from use of the actuating circuit.

DESCRIPTION OF THE PREFERRED EMBODIMENTS

Figure 1:
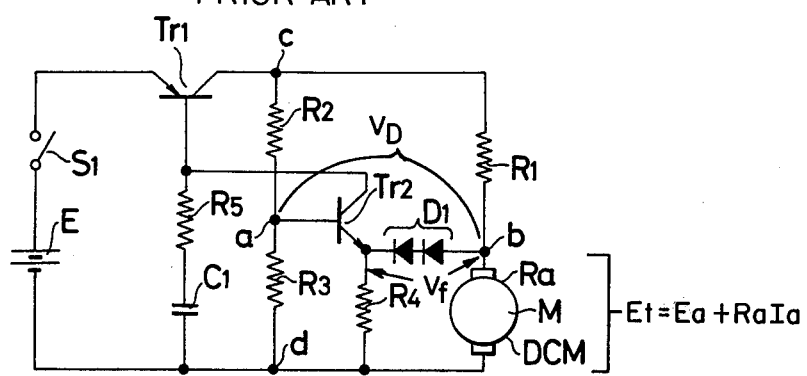
FIG. 1 is a circuit diagram of a conventional D.C. motor control apparatus.
Figure 2:
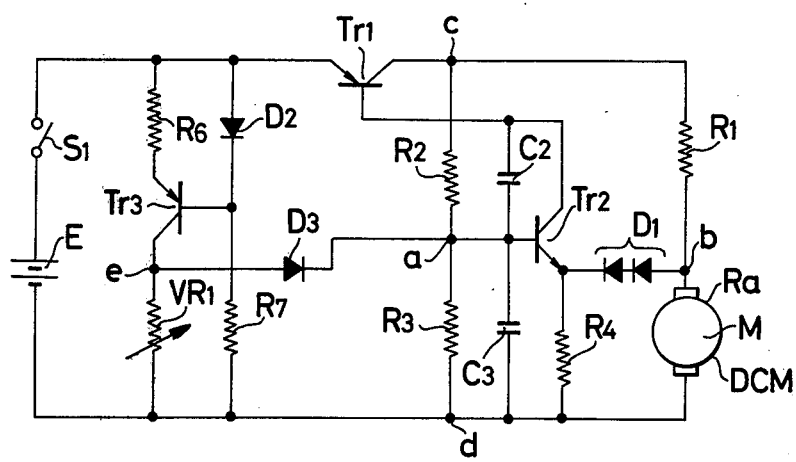
FIG. 2 is a circuit diagram of one embodiment of a D.C. motor control apparatus according to the present invention.

FIG. 2 shows a D.C. motor control circuit embodying the invention. Here the right-hand portion of the circuit is a Wheatstone type speed control circuit of conventional structure similar to that of FIG. 1. The same reference characters have been employed to denote parts similar to those of FIG. 1. The left-hand portion is an actuating circuit using characteristics of the present invention. In the actuating circuit of FIG. 2 a pnp transistor $Tr_3$ has an emitter electrode connected through a resistor $R_6$ to the positive bus at a point between the main switch $S_1$ and the emitter of the power supply control transistor $Tr_1$. A base electrode of the transistor $Tr_3$ is connected to a junction between a diode $D_2$ and a resistor $R_7$ which are connected in series across the positive and negative buses. The parts $Tr_3$, $R_6$, $R_7$ and $D_2$ form a constant current circuit. A variable resistor $VR_1$ in the actuating circuit is connected between the collector of transistor $Tr_3$ and the negative bus. The output of the variable resistor $VR_1$ appears at a point e between the collector of transistor $Tr_3$ and the variable resistor $VR_1$. This point is connected to the output a of the Wheatstone bridge circuit, and the base electrode of the transistor $Tr_2$ through a unidirectional conductor or diode $D_3$ poled toward the latter.

The operation of the apparatus of FIG. 2 is as follows. When the power switch $S_1$ is closed, a current of predetermined level flows through the variable resistor $VR_1$ from the constant current circuit. This renders transistor $Tr_2$ conductive if the variable resistor $VR_1$ is adjusted to produce an output voltage higher than the threshold level of the transistor $Tr_2$. When the transistor $Tr_2$ conducts, the transistor $Tr_1$ operates to supply power to the Wheatstone bridge circuit and simultaneously acutuate the D.C. motor DCM.

An advantage of the actuating circuit of the invention derives from the use of the constant current circuit, $Tr_3$, $R_6$, $R_7$, $D_2$. Because of this circuit even when the electrical power source E operates along a slow voltage ramp, the output voltage of the variable resistor $VR_1$ is coincident with the predetermined level therefor. This assures initiation of the motor DCM at the time the main switch $S_1$ is closed.

Another advantage is that the the invention permits opening of switch $S_1$ at the time the motor DCM is restrained, though this renders the transistors $Tr_1$, $Tr_2$ and $Tr_3$ non-conducting as in the prior art apparatus of FIG. 1. This is possible because when switch $S_1$ is thrown again, transistor $T_2$ is forcibly turned on by the voltage generated across the variable resistor $VR_1$ so that the motor DCM is actuated without fail.

A further advantage is that after the actuation of the motor DCM has been initiated, the potential at the point a becomes higher than that at the point. Hence no current flows from the actuating circuit to the Wheatstone bridge circuit. This cuts the actuating circuit off from its connection with the latter. During the operation of the motor DCM, therefore, the actuating circuit produces no adverse effect on the speed control of the motor DCM. This is true even when the voltage of the supply source E is permitted to increase to a considerable level after the actuation of the motor DCM, as the voltage across the variable resistor $VR_1$ is maintained constant by the constant current circuit $Tr_3$, $R_6$, $R_7$, $D_2$. Also, the one-way conductive means or diode $D_3$ functions to prevent occurrence of a forward current flow from the actuating circuit to the speed control circuit after the production of the voltage at point a higher than that at point e.

The use of the variable resistor $VR_1$ in the actuating circuit provides an advantage. Assume that the potential at the point e is made slightly higher than the threshold level of the transistor $Tr_2$ and that the desired speed of the motor DCM is made very high then the difference between the potential at point a corresponding to the selected speed of the motor DCM and the potential at point e becomes quite large. Even in this case, it is of course possible to effect actuation of motor DCM, though a considerable time is required for the actual speed of motor DCM to reach the desired speed. This is so because the transistor $Tr_2$ is driven only by the current flowing through the resistor $R_2$. The actuating current flowing through diode $D_3$ is stopped as soon as the transistor $Tr_2$ is rendered conductive. In order to reduce this time lag, however, according to the invention, the operator need only to adjust the variable resistor $VR_1$ so that the potential at point e becomes almost equal to that at point a which corresponds to the desired speed of motor DCM. If so, the actuating circuit continues to supply the voltage to the transistor $Tr_2$ until a time just before the motor DCM reaches the desired speed.

In order to remove electrical noise and to prevent oscillation, there are provided two capacitors $C_2$ and $C_3$ respectively connected between the base and collector of transistor $Tr_2$ and between the base of transistor $Tr_2$ and the negative bus.

Figure 3:
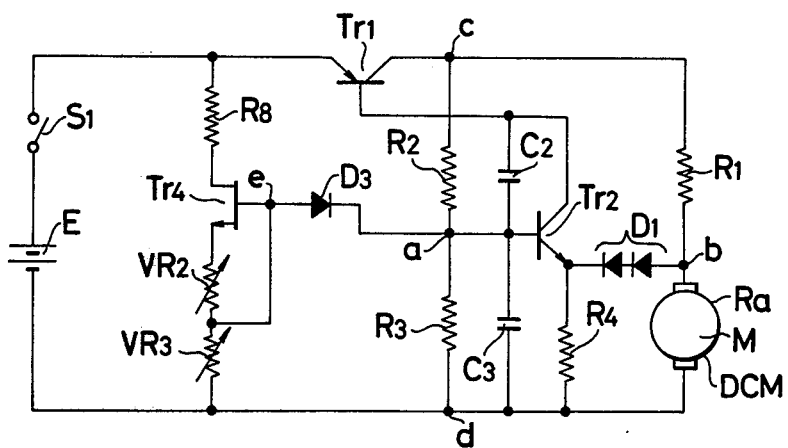
FIG. 3 is a similar diagram showing a second embodiment of the invention.

In FIG. 3, there is shown another embodiment of the actuating circuit according to the invention. Here the constant current circuit is constructed with a field effect transistor $Tr_4$ arranged with its drain electrode connected through a resistor $R_8$ to the positive bus. Its source electrode is connected through a dynamic characteristics-adjusting variable resistor $VR_2$ to a variable resistor $VR_3$ corresponding to that $VR_1$ of FIG. 2. Its substrate electrode is connected both to the junction between the variable resistors $VR_2$ and $VR_3$ and to the anode of diode $D_3$. Upon proper adjustment of the variable resistor $VR_2$, the transistor $TR_4$ is set to an optimum operating position as it serves as a constant current source.

In the above two embodiments of FIGS. 2 and 3, there is a disadvantage that the actuating current exiting from the diode $D_3$ is applied not only to the transistor $Tr_2$ but also to the resistor $R_3$ constituting one branch of the Wheatstone bridge circuit. That portion of the actuating current which flows through the resistor $R_3$ is entirely wasteful as no use is made in actuating the motor DCM. In order to eliminate this disadvantage, the present invention contemplates to use an additional diode $D_4$ for connection between the diode $D_3$ and the resistor $R_3$.

Figure 4:
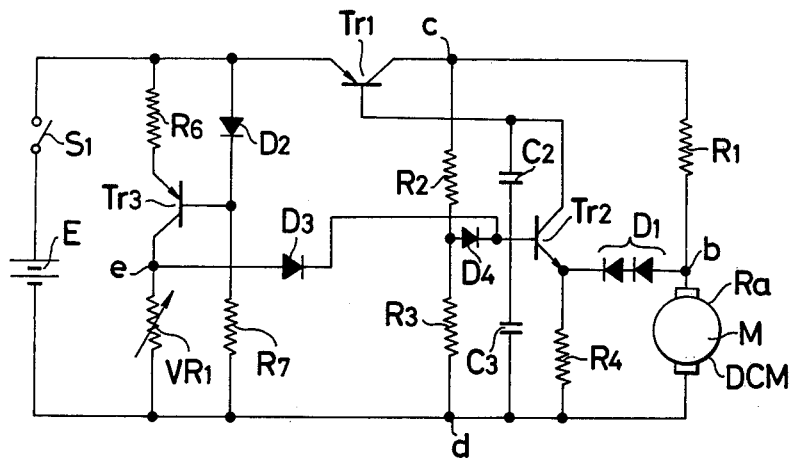
FIG. 4 is a similar diagram showing a third embodiment of the invention.
Figure 5:
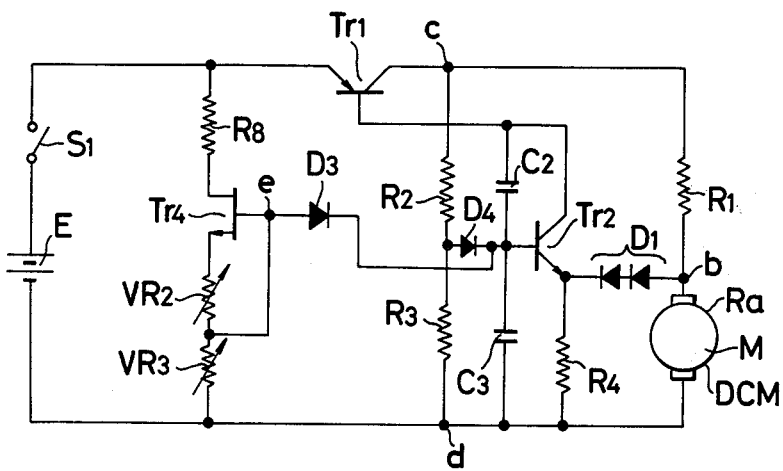
FIG. 5 is a similar diagram showing a fourth embodiment of the invention.

FIGS. 4 and 5 show additional two embodiments which differ respectively from those of FIGS. 2 and 3 in using this diode $D_4$ as arranged with its anode connected to the output point, a, of the Wheatstone bridge circuit and with its cathode connected to the base electrode of transistor $Tr_2$. The cathode of diode $D_3$ is connected to the junction between the diode $D_4$ and the base electrode of transistor $Tr_2$.

It will be seen from the foregoing that the present invention provides a D.C. motor control apparatus which enables the D.C. motor to be actuated for rotation without delay from the time when an actuating switch is operated. Even when the voltage of the power supply source falls considerably below a satisfactory operating level for the motor, the actuation of the motor can be secured. Further the apparatus of the invention permits the motor to be accelerated along a high ramp regardless of how fast a speed is selected, as the variable resistor $VR_1$ or $VR_3$ is adjusted to the corresponding resistance value, and then to be operated with minimum energy consumption.

What is claimed is:

1. A speed control sevice for D.C. motor comprising:
   (a) an electric power supply circuit;
   (b) a bridge circuit having branches and output as well as input terminals, the bridge circuit including the D.C. motor in one branch thereof and producing at its output terminals a first voltage corresponding to the speed of rotation of the D.C. motor;
   (c) driving means connected between the electric power supply circuit and the bridge circuit to supply driving current to said bridge circuit;
   (d) driving current control means coupled to said driving means and said output terminals for controlling said driving means on the basis of the first voltgage;
   (e) a control circuit including a constant current circuit and voltage preset means coupled to the constant current source for forming a constant voltage current, said control circuit being connected to said electric power supply circuit; and
   (f) one-way conductive means connected between the output of said constant voltage circuit and said driving current control means to apply an energizing voltage from said constant voltage circuit to the input terminal of said driving current control means at the time of actuation of said D.C. motor.

2. A speed control device according to claim 1, wherein said voltage preset means includes an impedance element connected in series to said constant current circuit.

3. A speed control device according to claim 2, wherein said impedance element consists of a resistor.

4. A speed control device for D.C. motor comprising:
   (a) an electric power supply circuit;
   (b) a resistor bridge circuit having branches and output terminals, the resistor bridge circuit including the D.C. motor in one branch thereof and producing from the output terminals a first voltage corresponding to the speed of rotation of the D.C. motor;
   (c) driving means connected between the electric power supply circuit and the resistor bridge circuit to supply driving current to said resistor bridge circuit;
   (d) driving current control means coupled to at least an output terminal of the bridge circuit for controlling said driving means on the basis of said first voltage;
   (e) a constant voltage circuit comprising a constant current circuit and variable resistor means connected in series with said constant current circuit for producing a desired output voltage, said constant voltage circuit being connected parallel to said electric power supply circuit; said constant voltage circuit having an output terminal and said driving current control means having an input terminal; and
   (f) one-way conductive means connected between the output terminal of said constant voltage circuit and the input terminal of said driving current control means to apply an energizing voltage from said constant voltage circuit to the input terminal of said driving current control means at the time of actuation of said D.C. motor.

5. A speed control device for D.C. motor, comprising:
   (a) an electric power supply circuit;
   (b) a resistor bridge circuit having branches and output terminals, the resistor bridge circuit including the D.C. motor in one branch thereof and producing from the output terminal a first voltage corresponding to the speed of rotation of the D.C. motor;
   (c) driving means connected between the electric power supply circuit and the resistor bridge circuit to supply driving current to said resistor bridge circuit;
   (d) driving current control means for controlling said driving means in accordance with the difference between said first voltage and a reference voltage;
   (e) a constant voltage circuit including a constant current circuit, said constant voltage circuit being connected parallel to said electric power supplying circuit;
   (f) first one-way conductive means connected between the output terminal of said constant voltage circuit and the input terminal of said driving current control means in order to apply the output voltage of said constant voltage circuit to the input terminal of said driving current control means at the time of actuation of said D.C. motor; and
   (g) second one-way conductive means connected between the output terminal of said first one-way conductive means and an intermediate point of resistor bridges of said resistor bridge circuit so as to hinder output voltage from said constant voltage circuit.

6. A speed control device according to claim 5, wherein said second one-way conductive means consists of a diode.

7. A speed control device for a D.C. motor, comprising:
   (a) an electric power supply circuit;
   (b) a resistor bridge having branches and output terminals, the resistor bridge including the D.C. motor in one branch thereof and producing from the output terminals a first voltage corresponding to the speed of rotation of the D.C. motor;
   (c) driving means connected between the electric power supply circuit and the resistor bridge to supply driving current to said resistor bridge;
   (d) driving current control means for controlling said driving means on the basis of said first voltage;
   (e) a control circuit including a constant current circuit and voltage preset means coupled to the constant current circuit for forming a constant voltage circuit, said control circuit being connected to said electric power circuit; said constant voltage circuit having an output terminal and said driving current control means having an input terminal;
   (f) first one-way conductive means connected between the output terminal of said constant voltage circuit and the input terminal of said driving current control means to apply an energizing voltage from said constant voltage circuit to the input terminal of said driving current control means at the time of actuation of the D.C. motor; and (g) second one-way conductive means connected between the output terminal of said first one-way conductive means and at a point between the branches of said resistor bridge so as to restrict the output voltage from said constant voltage circuit.

* * * * *